US010040469B2

(12) United States Patent
Bacallao et al.

(10) Patent No.: US 10,040,469 B2
(45) Date of Patent: Aug. 7, 2018

(54) SHOPPING CART BAGGING STATION AND METHOD OF FORMING THE SAME

(71) Applicant: Wal-Mart Stores, Inc., Bentonville, AR (US)

(72) Inventors: Yurgis Mauro Bacallao, Centerton, AR (US); Megan Baareman, Bentonville, AR (US); Diane Phillips, Bentonville, AR (US)

(73) Assignee: WAL-MART STORES, INC., Bentonville, AR (US)

(*) Notice: Subject to any disclaimer, the term of this patent is extended or adjusted under 35 U.S.C. 154(b) by 0 days.

(21) Appl. No.: 15/703,307

(22) Filed: Sep. 13, 2017

(65) Prior Publication Data
US 2018/0093690 A1 Apr. 5, 2018

Related U.S. Application Data

(60) Provisional application No. 62/402,475, filed on Sep. 30, 2016.

(51) Int. Cl.
| | | |
|---|---|---|
| *B62B 3/14* | (2006.01) | |
| *B62B 5/00* | (2006.01) | |
| *B65B 67/12* | (2006.01) | |

(52) U.S. Cl.
CPC .......... *B62B 3/1472* (2013.01); *B62B 3/1464* (2013.01); *B62B 5/00* (2013.01); *B62B 2202/26* (2013.01);
(Continued)

(58) Field of Classification Search
CPC ........ B65B 67/1227; B65B 2067/1294; B62B 3/1472; B62B 3/1464; B62B 2202/26
(Continued)

(56) References Cited

U.S. PATENT DOCUMENTS

| | | |
|---|---|---|
| 259,932 A | 6/1882 | Sims |
| 370,563 A | 9/1887 | Simmons |

(Continued)

FOREIGN PATENT DOCUMENTS

| | | |
|---|---|---|
| AU | 1142402 A1 | 4/2002 |
| AU | 2002364902 A1 | 5/2004 |

(Continued)

OTHER PUBLICATIONS

"Universal Double Car Vehicle Hangers/Hooks Grocery Bags/Handbags/Umbrellas Organizer—Black," DealsMachine.com, accessed on Oct. 15, 2015; 2 pages.

(Continued)

*Primary Examiner* — Justin Larson
(74) *Attorney, Agent, or Firm* — Schmeiser, Olsen & Watts LLP

(57) ABSTRACT

Described is a shopping cart bagging station. The shopping cart bagging station is a bagging station that couples to a shopping cart. The shopping cart bagging station described is used by customers to bag their purchases as they shop, or by employees bagging items for a customer. The shopping cart bagging station is designed to be heavy-duty so that it can be used in pick-up areas and other areas that require a bagging station that can withstand temperatures and handle heavy loads. The shopping cart bagging station includes a support structure and three shopping cart coupling hooks. The shopping cart coupling hooks couple the bagging station to a shopping cart, and they hold and dispense the shopping bags. The support structure and the three shopping cart coupling hooks are formed of metal rod that can withstand extremes in temperature and hold heavy loads.

18 Claims, 8 Drawing Sheets

(52) U.S. Cl.
CPC ... *B65B 67/1227* (2013.01); *B65B 2067/1294* (2013.01)

(58) Field of Classification Search
USPC .............. 224/411, 560; 280/33.992; D6/566; D34/27; 248/301, 303; D3/293
See application file for complete search history.

(56) References Cited

U.S. PATENT DOCUMENTS

| | | |
|---|---|---|
| 562,229 A | 6/1896 | Lenney |
| 635,100 A | 10/1899 | Huebel |
| 765,388 A | 7/1904 | Lanpher |
| 797,871 A | 8/1905 | Smith |
| 809,568 A | 1/1906 | Hulburt |
| 873,188 A | 12/1907 | Thumann |
| 890,693 A | 6/1908 | McCoy |
| 893,930 A | 7/1908 | Lederman |
| 896,443 A | 8/1908 | Dyett |
| 936,736 A | 10/1909 | Porter et al. |
| 995,798 A | 6/1911 | McCullough |
| 1,055,745 A | 3/1913 | Harrison |
| 1,069,108 A | 8/1913 | Buhl |
| 1,252,740 A | 1/1918 | Thornblade |
| 1,284,579 A | 11/1918 | Brown |
| 1,662,140 A | 3/1928 | Whitesides |
| 2,240,629 A | 5/1941 | Smith |
| 2,498,446 A | 2/1950 | Pawsat |
| 2,563,679 A | 8/1951 | Hardy |
| 2,603,438 A | 7/1952 | Adams |
| 2,682,956 A | 7/1954 | Pike |
| 2,797,058 A | 6/1957 | Packham |
| 3,133,660 A | 5/1964 | Roberts |
| 3,266,742 A | 8/1966 | Pena |
| 3,313,504 A | 4/1967 | Thorkild |
| 3,339,745 A * | 9/1967 | Sugerman ................ A47F 7/02 211/85.2 |
| D209,279 S * | 11/1967 | Cohen ............................ D34/17 |
| 3,438,644 A | 4/1969 | Kaplan et al. |
| 3,475,067 A | 10/1969 | Girard |
| 3,747,298 A | 7/1973 | Lieberman |
| 3,930,696 A | 1/1976 | Hight et al. |
| 3,943,859 A | 3/1976 | Boone |
| 3,995,803 A | 12/1976 | Uitz |
| 4,048,754 A | 9/1977 | Laux |
| 4,082,939 A | 4/1978 | Walters |
| 4,106,617 A | 8/1978 | Boone |
| 4,269,336 A | 5/1981 | Humlong |
| 4,305,558 A | 12/1981 | Baker |
| 4,354,643 A | 10/1982 | Kenner |
| 4,376,502 A * | 3/1983 | Cohen ................... B62B 3/1464 224/411 |
| 4,403,807 A | 9/1983 | Wilkinson et al. |
| 4,456,125 A | 6/1984 | Chap |
| 4,583,753 A | 4/1986 | Economy |
| 4,595,153 A | 6/1986 | Goetz |
| 4,655,409 A | 4/1987 | Zima |
| 4,682,782 A | 7/1987 | Mills |
| 4,728,070 A | 3/1988 | Engelbrecht |
| 4,838,504 A | 6/1989 | Bittenbinder |
| D302,062 S | 7/1989 | Sable |
| 4,881,577 A | 11/1989 | Stroh et al. |
| 4,968,047 A | 11/1990 | Ferris |
| 4,974,799 A | 12/1990 | Palmer |
| 4,998,647 A | 3/1991 | Sharp |
| 4,998,694 A | 3/1991 | Barteaux |
| 5,190,253 A | 3/1993 | Sable |
| 5,362,077 A * | 11/1994 | Adamson ............. B62B 3/1472 211/71.01 |
| 5,366,123 A | 11/1994 | Range |
| 5,385,318 A | 1/1995 | Rizzuto |
| 5,390,443 A | 2/1995 | Emalfarb et al. |
| 5,437,346 A | 8/1995 | Dumont |
| 5,443,173 A | 8/1995 | Emery et al. |
| D363,208 S * | 10/1995 | Seidel ............................ D6/566 |
| 5,460,279 A | 10/1995 | Emery et al. |
| 5,465,846 A | 11/1995 | Blyth et al. |
| 5,531,366 A | 7/1996 | Strom |
| 5,564,566 A | 10/1996 | Lamb |
| 5,618,008 A | 4/1997 | Dearwester et al. |
| 5,704,497 A | 1/1998 | Wyatt |
| 5,727,721 A | 3/1998 | Guido et al. |
| D396,372 S * | 7/1998 | Goodman ..................... D6/566 |
| 5,836,486 A * | 11/1998 | Ohsugi .................. A47G 25/32 211/113 |
| 5,875,902 A | 3/1999 | Emery et al. |
| D412,080 S * | 7/1999 | Emery ........................... D6/513 |
| 6,018,397 A | 1/2000 | Cloutier et al. |
| 6,041,945 A | 3/2000 | Faraj |
| 6,086,023 A | 7/2000 | Kerr et al. |
| 6,109,462 A | 8/2000 | Emalfarb et al. |
| 6,155,521 A | 12/2000 | O'hanlon |
| 6,170,679 B1 | 1/2001 | Frye |
| 6,193,265 B1 | 2/2001 | Yemini |
| 6,299,001 B1 | 10/2001 | Frolov et al. |
| 6,305,572 B1 | 10/2001 | Daniels et al. |
| D452,944 S | 1/2002 | Schmidt |
| 6,341,704 B1 | 1/2002 | Michel, Jr. |
| 6,364,266 B1 * | 4/2002 | Garvin ..................... F16L 3/02 248/303 |
| 6,390,422 B2 | 5/2002 | Banko |
| 6,409,031 B1 | 6/2002 | Wynne |
| D459,979 S * | 7/2002 | Goodman ..................... D6/566 |
| 6,543,638 B2 | 4/2003 | Wile |
| 6,561,403 B1 | 5/2003 | Kannankeril et al. |
| 6,601,759 B2 | 8/2003 | Fife et al. |
| 6,606,411 B1 | 8/2003 | Loui et al. |
| 6,607,229 B1 | 8/2003 | McIntosh |
| 6,648,265 B2 | 11/2003 | Goldberg |
| 6,655,537 B1 | 12/2003 | Lang et al. |
| 6,685,075 B1 | 2/2004 | Kannankeril |
| 6,726,145 B1 | 4/2004 | Kraus |
| 6,726,156 B1 | 4/2004 | Scola |
| D490,691 S | 6/2004 | Buss et al. |
| 6,745,186 B1 | 6/2004 | Testa et al. |
| 6,789,687 B2 | 9/2004 | Cramer |
| 6,805,271 B2 | 10/2004 | Holden |
| 6,810,149 B1 | 10/2004 | Squilla et al. |
| 6,832,739 B1 | 12/2004 | Kraus |
| 6,886,101 B2 | 4/2005 | Glazer et al. |
| 6,937,989 B2 | 8/2005 | Mcintyre et al. |
| 7,066,389 B2 | 6/2006 | Dickover et al. |
| 7,077,612 B1 * | 7/2006 | Diggle, III ............. A63B 27/00 248/303 |
| 7,128,251 B1 | 10/2006 | Galle |
| 7,172,092 B2 | 2/2007 | Yang et al. |
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S * | 6/2008 | Waldman ......................... D34/6 |
| D575,973 S * | 9/2008 | Goodman ..................... D6/566 |
| 7,431,208 B2 | 10/2008 | Feldman et al. |
| 7,475,885 B2 | 1/2009 | Kovath |
| 7,530,537 B2 * | 5/2009 | Kandah ............... B65B 67/1216 220/482 |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,850,014 B2 | 12/2010 | Nguyen et al. |
| 7,887,068 B2 | 2/2011 | Ferguson |
| 8,069,092 B2 | 11/2011 | Bryant |
| D650,209 S | 12/2011 | Snider |
| D654,737 S * | 2/2012 | Guindi ........................... D6/514 |
| D666,858 S * | 9/2012 | Goodman ..................... D6/566 |
| D667,250 S * | 9/2012 | Goodman ..................... D6/566 |
| 8,292,094 B2 | 10/2012 | Morton |
| 8,336,800 B1 | 12/2012 | Lopez |
| D689,282 S | 9/2013 | Lindeman |
| 8,572,712 B2 | 10/2013 | Rice et al. |

(56) References Cited

U.S. PATENT DOCUMENTS

| | | | |
|---|---|---|---|
| D693,577 S | 11/2013 | Goodman et al. | |
| 8,668,207 B1 | 3/2014 | Gilliam | |
| 8,746,640 B2 * | 6/2014 | Broadley | F16B 45/00 248/220.21 |
| 8,814,039 B2 | 8/2014 | Bishop et al. | |
| D713,663 S * | 9/2014 | Pryor | D6/709.2 |
| 8,820,633 B2 | 9/2014 | Bishop et al. | |
| 8,851,369 B2 | 10/2014 | Bishop et al. | |
| D718,054 S | 11/2014 | Goodman et al. | |
| D719,372 S * | 12/2014 | Goodman | D6/514 |
| 8,905,411 B1 | 12/2014 | Blanton | |
| D720,538 S | 1/2015 | Goodman et al. | |
| D728,255 S | 5/2015 | Guindi et al. | |
| 9,199,656 B1 | 12/2015 | Tong et al. | |
| D746,592 S | 1/2016 | Goodman et al. | |
| D747,876 S | 1/2016 | Goodman et al. | |
| D750,472 S * | 3/2016 | Kuka | D8/367 |
| D751,763 S * | 3/2016 | Goodman | D26/38 |
| D784,721 S | 4/2017 | Goodman et al. | |
| 9,623,995 B2 | 4/2017 | Tan | |
| D785,333 S | 5/2017 | Goodman et al. | |
| D785,369 S * | 5/2017 | Goodman | D6/566 |
| D787,303 S * | 5/2017 | Garvin | D8/367 |
| 9,656,827 B2 | 5/2017 | Sudhir | |
| 9,737,141 B2 | 8/2017 | Johnson | |
| D796,771 S * | 9/2017 | Bacallao | D34/27 |
| D803,032 S | 11/2017 | Jammehdiabadi | |
| 9,844,283 B2 * | 12/2017 | Bacallao | A47F 9/042 |
| 2002/0145086 A1 | 10/2002 | Alvarado et al. | |
| 2002/0170937 A1 | 11/2002 | Yeh et al. | |
| 2002/0185510 A1 | 12/2002 | Holsclaw | |
| 2002/0185513 A1 | 12/2002 | Morris | |
| 2003/0000905 A1 | 1/2003 | Zidek | |
| 2003/0042694 A1 | 3/2003 | Werner | |
| 2003/0052464 A1 | 3/2003 | McGuire | |
| 2003/0098326 A1 | 5/2003 | Wile | |
| 2003/0121871 A1 | 7/2003 | Zadro | |
| 2003/0198390 A1 | 10/2003 | Loui et al. | |
| 2004/0000529 A1 | 1/2004 | Gladnick et al. | |
| 2004/0000612 A1 | 1/2004 | Young | |
| 2004/0075015 A1 | 4/2004 | Cain et al. | |
| 2004/0124598 A1 | 7/2004 | Williams | |
| 2004/0139398 A1 | 7/2004 | Testa et al. | |
| 2004/0178298 A1 | 9/2004 | Kennard | |
| 2004/0262385 A1 | 12/2004 | Blaeuer | |
| 2005/0056718 A1 | 3/2005 | Kamenstein | |
| 2005/0205578 A1 | 9/2005 | Yeh | |
| 2005/0284729 A1 | 12/2005 | LoRusso | |
| 2006/0097467 A1 | 5/2006 | Solomon et al. | |
| 2006/0124799 A1 | 6/2006 | Johnson | |
| 2006/0226187 A1 | 10/2006 | Linker | |
| 2007/0095769 A1 | 5/2007 | Jenkins | |
| 2007/0176058 A1 | 8/2007 | Kohn | |
| 2007/0186515 A1 | 8/2007 | Ruetten et al. | |
| 2007/0204044 A1 | 8/2007 | Rice et al. | |
| 2007/0261159 A1 | 11/2007 | Marks | |
| 2007/0278359 A1 | 12/2007 | Kandah | |
| 2008/0000910 A1 | 1/2008 | Gaillard | |
| 2008/0001019 A1 | 1/2008 | Brown | |
| 2008/0215448 A1 | 9/2008 | Boyle et al. | |
| 2008/0215449 A1 | 9/2008 | Boyle et al. | |
| 2008/0245684 A1 | 10/2008 | Yeatman | |
| 2009/0078731 A1 | 3/2009 | Yi | |
| 2009/0078815 A1 | 3/2009 | Tong et al. | |
| 2009/0092342 A1 | 4/2009 | Rolim de Oliveira | |
| 2009/0184162 A1 | 7/2009 | Rice et al. | |
| 2009/0261050 A1 | 10/2009 | Curren | |
| 2009/0319352 A1 | 12/2009 | Boyle et al. | |
| 2009/0327087 A1 | 12/2009 | Beck et al. | |
| 2010/0096514 A1 | 4/2010 | Adair et al. | |
| 2010/0102014 A1 | 4/2010 | Yang | |
| 2010/0123050 A1 | 5/2010 | Astwood | |
| 2010/0148019 A1 | 6/2010 | Simhaee | |
| 2010/0219219 A1 | 9/2010 | Svetina | |
| 2010/0264101 A1 | 10/2010 | Ma | |
| 2011/0266092 A1 | 11/2011 | Marquis et al. | |
| 2012/0125970 A1 | 5/2012 | Tsui | |
| 2012/0167182 A1 | 6/2012 | Rice et al. | |
| 2012/0169020 A1 | 7/2012 | Farrell | |
| 2012/0305618 A1 | 12/2012 | Tan | |
| 2012/0305619 A1 | 12/2012 | Tan | |
| 2013/0026120 A1 | 1/2013 | Johnson | |
| 2013/0037665 A1 | 2/2013 | Brasell et al. | |
| 2013/0092804 A1 | 4/2013 | Laitila et al. | |
| 2013/0134181 A1 | 5/2013 | Helseth et al. | |
| 2013/0330163 A1 | 12/2013 | Marsh | |
| 2014/0048576 A1 | 2/2014 | Tan | |
| 2014/0131506 A1 | 5/2014 | Clarkin | |
| 2014/0144966 A1 | 5/2014 | Tan | |
| 2014/0209651 A1 | 7/2014 | Wilfong | |
| 2014/0367507 A1 | 12/2014 | Trampolski | |
| 2016/0016752 A1 | 1/2016 | Helseth et al. | |
| 2016/0096542 A1 | 4/2016 | Fukushima | |
| 2016/0183744 A1 | 6/2016 | Sadikov et al. | |
| 2016/0227969 A1 | 8/2016 | Morris | |
| 2016/0242605 A1 | 8/2016 | Heymann et al. | |
| 2016/0270607 A1 | 9/2016 | Zeng | |
| 2016/0300235 A1 | 10/2016 | Boyle et al. | |
| 2016/0367088 A1 | 12/2016 | Allard et al. | |
| 2017/0066550 A1 | 3/2017 | Tsai | |
| 2017/0172322 A1 | 6/2017 | Bacallao | |
| 2017/0174243 A1 * | 6/2017 | Bacallao | B62B 3/106 |
| 2017/0197650 A1 * | 7/2017 | Whistler | B62B 3/1472 |
| 2017/0259959 A1 | 9/2017 | Nilsson et al. | |
| 2017/0267412 A1 | 9/2017 | Krause | |
| 2017/0275126 A1 | 9/2017 | Sudhir | |
| 2017/0325603 A1 * | 11/2017 | Bacallao | A47F 9/042 |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

"Over-the-Door Hook 3 Hook InterDesign," Target.com, accessed on Oct. 15, 2015; 4 pages.

JoshM "Smart Shopping Cart: Bagging Station Design," EECS398SmartShoppingCart.blogspot.in, Mar. 22, 2015; 2 pages.

"Clear Suspended Ceiling Hook," DoItBest.com, accessed on Oct. 14, 2015; 3 pages.

"Industrial T-shirt Bag Stand—Just like Grocery Stores," SmallBizWarehouse.com, accessed on Oct. 14, 2015; 4 pages.

"Dual L-Shape Flash Bracket Holder Mount for Canon Nikon Speedlikte DSLR Camera," Amazon.com, accessed on Jan. 5, 2016; 5 pages.

"InterDesign Classico Over-the-Door Tie and Belt Rack," HoldnStorage.com, accessed on Nov. 22, 2016; 2 pages.

"Small Matte 'So-Hooked' Rack," The Container Store, accessed on Nov. 22, 2016; 2 pages.

"POS Check Out Plastic Bag Holder Dispenser FOR Retail Supermarket Brand New!" Ebay.com, accessed on Nov. 17, 2016; 5 pages.

(56) References Cited

OTHER PUBLICATIONS

"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"Simplehuman Stainless Steel Grocery Bag Holder," ContainerStore.com, accessed on Jun. 14, 2017; 2 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Search Report in GB Patent Application No. GB1713283.8, dated Dec. 22, 2017; 4 pages.
Notice of Allowance in U.S. Appl. No. 15/653,768, dated May 2, 2018; 12 pages.
Non-Final Office Action in U.S. Appl. No. 15/383,151, dated May 25, 2018; 13 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.

* cited by examiner

SHOPPING CART BAGGING STATION AND METHOD OF FORMING THE SAME

CROSS REFERENCE TO RELATED APPLICATION

This invention claims priority to U.S. provisional patent application Ser. No. 62/402,475, filed Sep. 30, 2016 to Applicant Wal-Mart Stores Inc., and entitled "Shopping Cart Bagging Station and Method of Forming the Same", which is incorporated entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where purchased items have traditionally been transferred from a shopping cart to the shopping bags. With the advent of electronic purchasing and self-checkout, however, customers are now able to pay for and bag their items as they shop, and these actions can occur at locations besides checkout stations. There is a need for bagging stations in locations in retail stores besides at the checkout station. Additionally, there is a need for a bagging station that can withstand extreme temperatures and hold bags with heavy items. This is particularly useful for use in a pickup area of a retail store.

Accordingly, what is needed is a bagging station for mounting in a shopping cart, which is durable and compact, and can hold bags with heavy items in them.

DETAILED DESCRIPTION OF EMBODIMENTS OF THE INVENTION

Disclosed herein are embodiments of an invention related to retail store fixtures, and, more specifically, to a bagging station that couples to a shopping cart. A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products. The disclosed shopping cart bagging station couples to a shopping cart so that customers can bag their purchases as they shop, or employees can bag items while using the shopping cart. The disclosed shopping cart bagging station is designed to be heavy duty so that it can be used in pick-up areas and other areas that require a bagging station that can withstand temperatures and handle heavy loads. The disclosed shopping cart bagging station is hung from a shopping cart so it is easy to couple to and remove from the shopping cart, and it is easy to hang in different locations on the shopping cart.

The disclosed shopping cart bagging station includes a support structure and three shopping cart coupling hooks coupled to the support structure. The shopping cart coupling hooks couple the bagging station to a shopping cart, and hold and dispense the shopping bags. The support structure and the three shopping cart coupling hooks are formed of rigid or semi-rigid metal wire that can withstand extremes in temperature and hold heavy loads.

The shopping cart bagging station holds a plurality of shopping bags, and dispenses the shopping bags one at a time as products are placed in a shopping bag. One of the shopping cart coupling hooks holds a stack of shopping bags ready to be opened and filled. The other two shopping cart coupling hooks each hold a handle of a shopping bag so the shopping bag is held open and items can be placed in the shopping bag. The three shopping cart coupling hooks are a means to couple the bagging station to a shopping cart, a means to hold a stack of shopping bags, and a means to hold the bags open while being filled.

The shopping cart bagging station can be mounted at various locations on a shopping cart, making it easy and convenient for a customer to carry and load a plurality of shopping bags as they shop. The disclosed shopping cart bagging station provides a means for a customer to load purchases into bags as they shop, instead of having to bag their purchases at a checkout station. And, the disclosed shopping cart bagging station provide a way for employees to load and carry a maximum amount of bags with a shopping cart at a pickup station.

Figure 1:
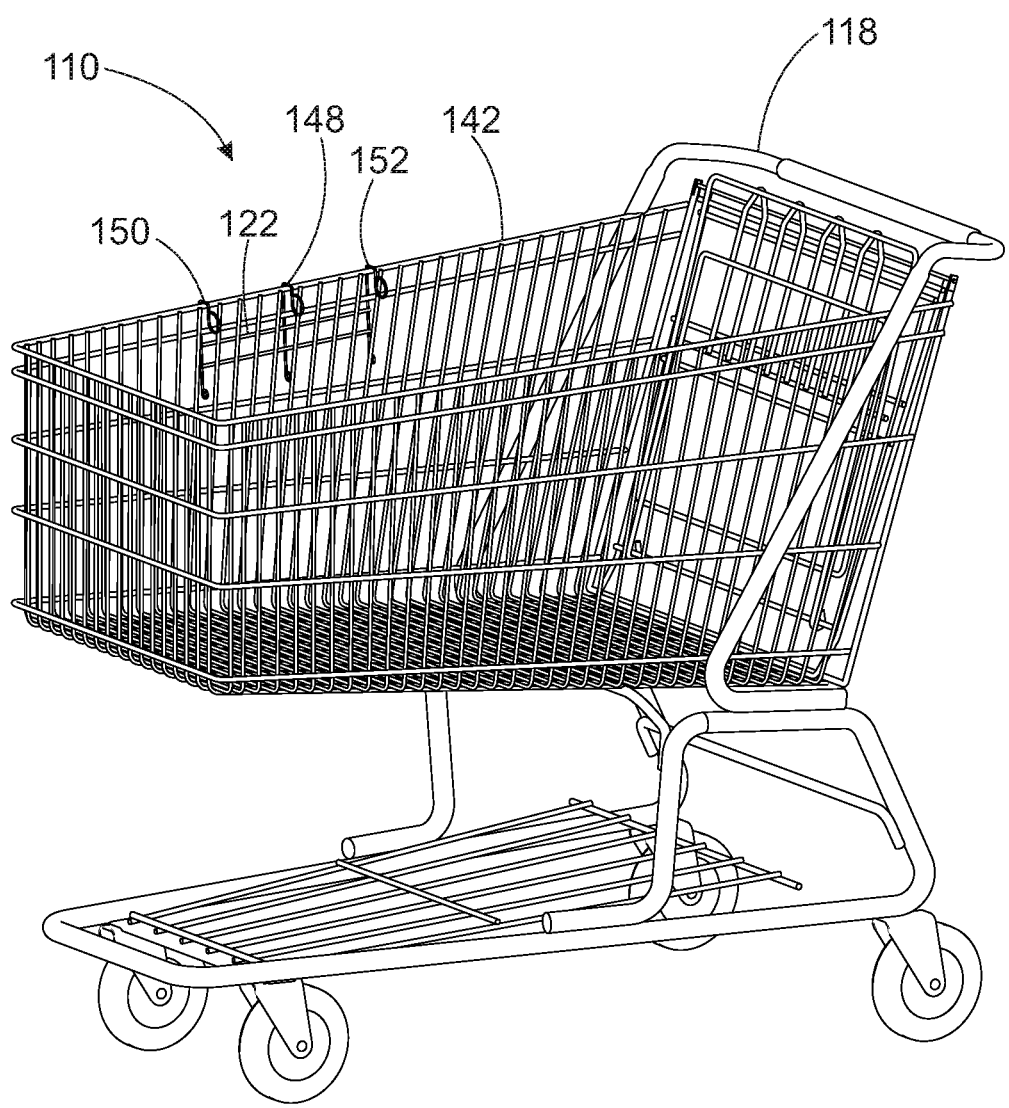
FIG. 1 shows a shopping cart bagging station coupled to a shopping cart.

FIG. 1 shows a perspective view of a shopping cart bagging station 110 coupled to a shopping cart 118. Shopping cart bagging station 110 is shown hanging from a side 142 of shopping cart 118. It is to be understood that shopping cart bagging station 110 can be hung in many different positions inside and outside of shopping cart 118. With shopping cart bagging station 110 hung from side 142 of shopping cart 118, a customer or an employee can easily and conveniently use shopping cart bagging station 110 to hold and dispense shopping bags while shopping or working. Shopping cart bagging station 110 includes a support structure 122, which forms the skeletal backbone of shopping cart bagging station 110, and a first, second and third cart coupling hook 150, 152, and 148, which are each coupled to support structure 122. Each of first, second, and third cart coupling hooks 150, 152, and 148 couple shopping cart bagging station 110 to shopping cart 118, and help to hold and dispense shopping bags. First, second, and third cart coupling hooks 150, 152, and 148 are hung over side 142 of shopping cart 118 to couple shopping cart bagging station 110 to shopping cart 118, in this embodiment.

Figure 2:
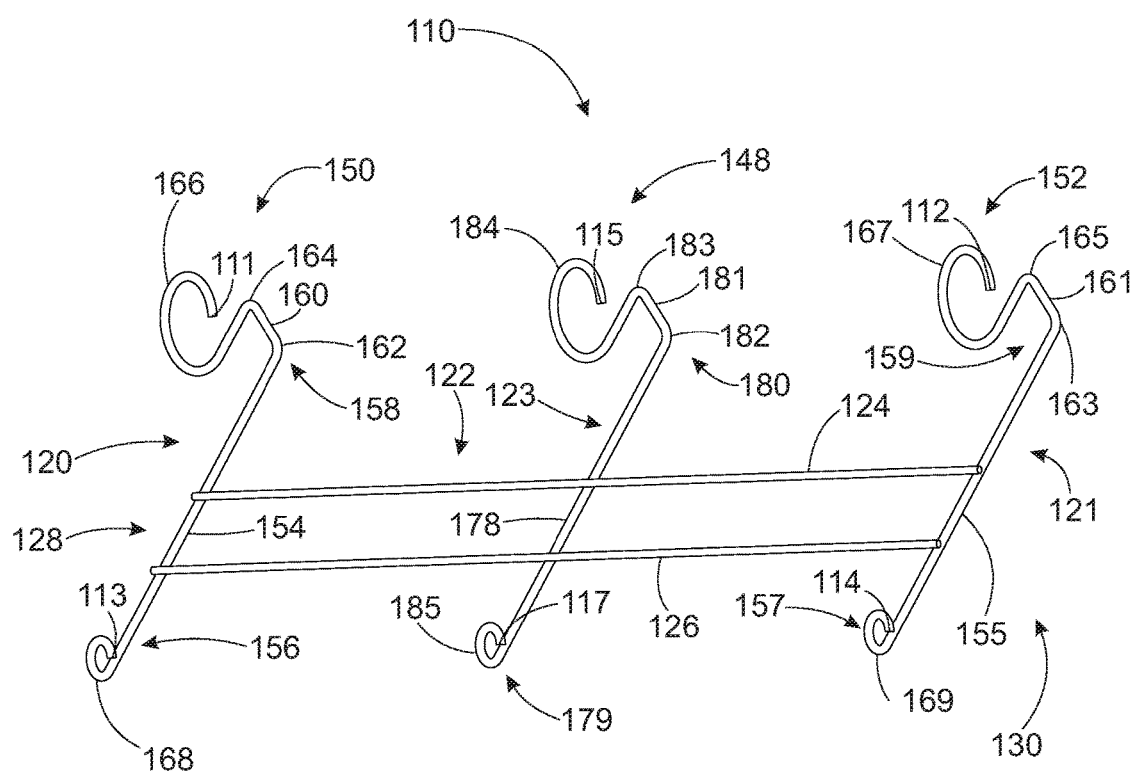
FIG. 2 shows a front perspective view of a shopping cart bagging station.
Figure 3:
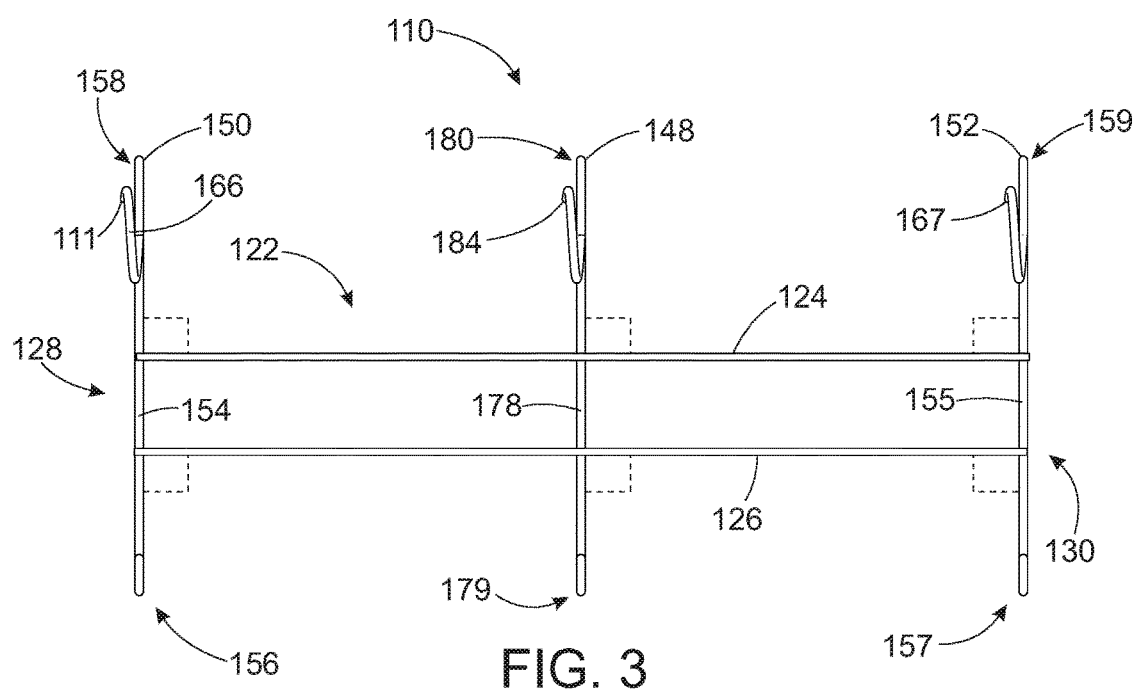
FIG. 3 shows a front view of the shopping cart bagging station of FIG. 2.
Figure 4:
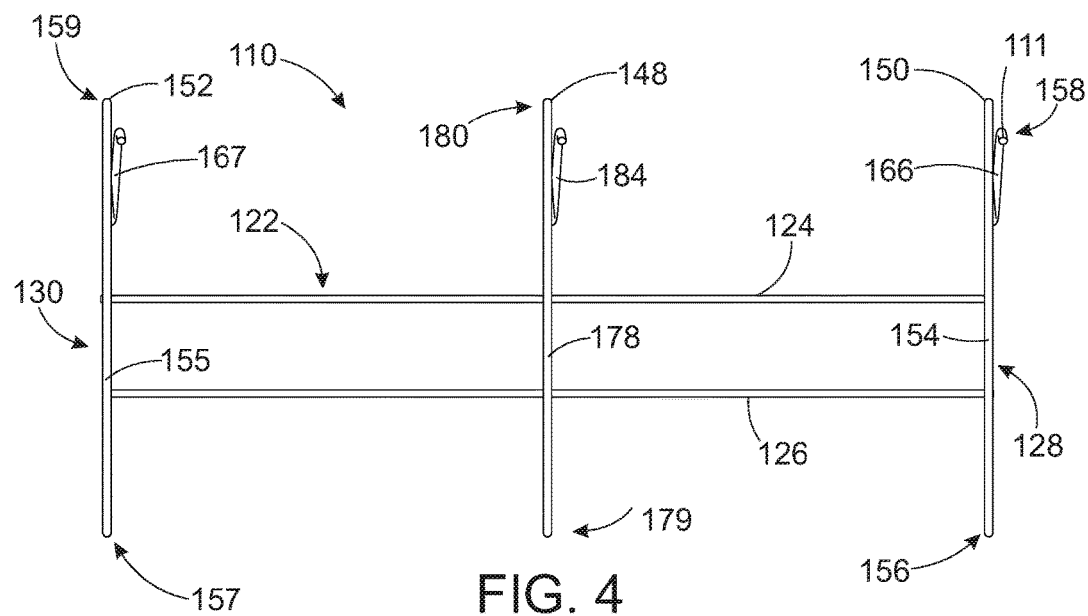
FIG. 4 shows a rear view of the shopping cart bagging station of FIG. 2.
Figure 5:
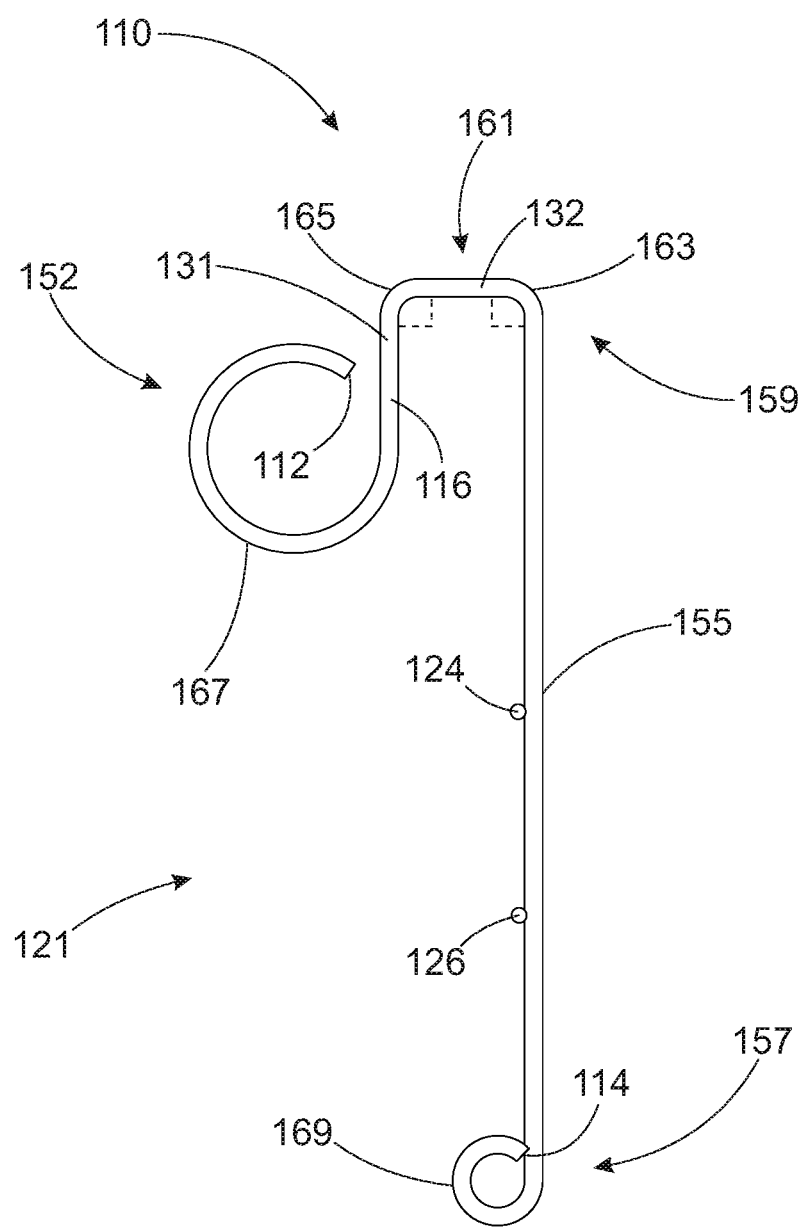
FIG. 5 shows a side view of the shopping cart bagging station of FIG. 2.

FIG. 2 through FIG. 5 show details of shopping cart bagging station 110. FIG. 2 shows a front perspective view of shopping cart bagging station 110. FIG. 3 and FIG. 4 show front and rear views, respectively, of shopping cart bagging station 110. FIG. 5 shows a side view of shopping cart bagging station 110.

Shopping cart bagging station 110 includes support structure 122, and three cart coupling hooks, which include first cart coupling hook 150, second cart coupling hook 152, and third cart coupling hook 148. Each of first second, and third cart coupling hooks 150, 152, and 148 couple shopping cart bagging station 110 to shopping cart 118, as seen in FIG. 1. Support structure 122 and first, second, and third cart coupling hooks 150, 152, and 148 are formed of plastic-coated rigid metal wire in this embodiment, but this is not meant to be limiting. Support structure 122 and first, second, and third cart coupling hooks 150, 152, and 148 can be formed of any rigid or semi-rigid material that can hang from shopping cart 118 and hold and dispense a stack of plastic shopping bags. Rigid metal wire is used in this embodiment because it can withstand temperatures and hold heavy items. Plastic coating the rigid metal wire is used for safety of the user and to extend the lifetime of shopping cart bagging station 110.

Third cart coupling hook 148 is used to hold a stack of shopping bags using the center hole in the stack of bags. First and second cart coupling hooks 150 and 152 each hold a handle of the stack of one or more shopping bags. Support structure 122 couples first, second, and third cart coupling hooks 150, 152, and 148 together and holds them in place. With shopping cart bagging station 110 coupled to shopping cart 118 as shown in FIG. 1, an employee or a customer can use shopping cart bagging station 110 to hold a stack of shopping bags, and hold one shopping bag open as the shopping bag is filled with items. To fill a shopping bag, a bag hung from third cart coupling hook 148 is held open by hanging the two shopping bag handles on first and second cart coupling hooks 150 and 152. Items are placed in the shopping bag until the shopping bag is filled. The shopping bag is then removed from shopping cart bagging station 110 and placed in the shopping cart or carried from the store. In some cases, a plurality of shopping cart bagging stations 110 are coupled to a shopping cart, with each one holding a plurality of shopping bags. Shopping cart bagging station 110 is designed to be sturdy so that shopping cart bagging station 110 can hold a shopping bag in place with a heavy load in the shopping bag.

Each of first, second, and third cart coupling hooks 150, 152, and 148 are fixedly attached to support structure 122. Support structure 122 couples each of first, second, and third cart coupling hooks 150, 152, and 148 together and provides the structural support for shopping cart bagging station 110. Support structure 122 is formed of two metal bars in this embodiment, top support bar 124 and bottom support bar 126. Top support bar 124 and bottom support bar 126 are each formed of elongate rigid or semi-rigid bars, rods or wires. In this embodiment, top support bar 124 and bottom support bar 126 are rigid plastic-coated metal rods. Top support bar 124 and bottom support bar 126 are each individually attached to each of first, second, and third cart coupling hooks 150, 152, and 148. Top support bar 124 and bottom support bar 126 are parallel to each other, in this embodiment. Support structure 122 has a support structure first end 128 and a support structure second end 130 opposing support structure first end 128. Support structure 122 can take many different forms. In some embodiments, support structure 122 is a metal plate or a pair of metal plates, for example but not by way of limitation.

First cart coupling hook 150 is coupled to support structure first end 128, and second cart coupling hook 152 is coupled to support structure second end 130. By positioning first and second cart coupling hooks 150 and 152 at either end of support structure 122, first and second cart coupling hooks 150 and 152 are positioned to hold the two handles of one or more shopping bags so that the bag is held open to be filled.

Third cart coupling hook 148 is coupled to support structure 122 between support structure first end 128 and support structure second end 130. Third cart coupling hook 148 is coupled to support structure 122 between support structure first end 128 and support structure second end 130 because third cart coupling hook 148 is meant to extend through the center hole of the stack of plastic shopping bags, and the center hole is between the two handles. In this embodiment, third cart coupling hook 148 is coupled to support structure 122 halfway between support structure first end 128 and support structure second end 130, but this is not meant to be limiting.

First, second, and third cart coupling hooks 150, 152, and 148 are each configured to both couple shopping cart bagging station 110 to shopping cart 118, and to help hold and dispense a stack of shopping bags. Each of first, second, and third cart coupling hooks 150, 152, and 148 are formed of an elongate rod that is bent to form different sections. The sections include a shaft, a helical, hook and a rectangular hook. Each elongate rod is formed of rigid or semi-rigid material. In this embodiment, each elongate rod is formed of rigid plastic-coated wire, but this is not meant to be limiting.

First cart coupling hook 150 is formed of a first elongate rod 120 (FIG. 2). First elongate rod 120 has a first elongate rod first end 111 and a first elongate rod second end 113, as shown in FIG. 2. First elongate rod 120 of first cart coupling hook 150 includes a first shank 154, a first rectangular hook 160, and a first helical hook 166. First shank 154 and first rectangular hook 160 couple cart coupling hook 150, and shopping cart bagging station 110, to shopping cart 118. First helical hook 166 holds the handle of one or more shopping bags so the shopping bags can be filled.

First shank 154 is coupled to support structure 122, see FIG. 2, FIG. 3, and FIG. 4. In this embodiment, first shank 154 is coupled to support structure 122 first end 128. First shank 154 is coupled to top support bar 124 and bottom support bar 126 of support structure 122. First shank 154 has a first shank first end 158 and a first shank second end 156 opposing first shank first end 158. First shank 154 opposes first helical hook 166, with first rectangular hook 160 between first helical hook 166 and first shank 154. First shank 154 extends down side 142 of shopping cart 118 when shopping cart bagging station 110 is coupled to shopping cart 118, as shown in FIG. 1. First shank 154 stabilizes shopping cart bagging station 110 when a full shopping bag is hung from shopping cart bagging station 110, and keeps the shopping bag from pulling shopping cart bagging station 110 off side 142.

First shank second end 156, in this embodiment, has a first end loop 168 coupled to first shank second end 156. First end loop 168 helps to keep shopping cart bagging station 110 from sliding sideways on side 142 of shopping cart 118 by holding shopping cart bagging station 110 steady against the bars of shopping cart 118. First shank first end 158 is coupled to first rectangular hook 160. First shank 154 is formed of a portion of rigid metal wire that is straight, in this embodiment, but this is not meant to be limiting. In some embodiments, first shank 154 has one or more bends (see, for example, shopping cart bagging station 210 shown in FIG. 6 and FIG. 7).

First rectangular hook 160 is coupled to first shank first end 158. First rectangular hook 160 hangs over side 142 of shopping cart 118 to couple shopping cart bagging station 110 to shopping cart 118. First rectangular hook 160 includes a first bend 162 and a second bend 164. Each of first bend 162 and second bend 164 are right angle (90 degree) bends in this embodiment. In this way, first rectangular hook 160 is configured to hang from side 142 of shopping cart 118. First rectangular hook 160 separates first helical hook 166 from first shank 154.

First helical hook 166 is in the shape of a cylindrical helix. First helical hook 166 holds a handle of one or more shopping bags. First helical hook 166 is coupled to first rectangular hook 160. First helical hook 166 is helical shaped, in this embodiment, so that shopping bag handles can be easily put on first helical hook 166, and removed from first helical hook 166. The helix shape offsets first elongate rod first end 111 from rectangular hook 160 and first shaft 154, as best seen in FIG. 3 and FIG. 4. This offset of first elongate rod first end 111 makes it easy to put bags on helical hook 166. In some embodiments, first helical hook 166 has other shapes (see, for example, shopping cart bagging station 310 shown in FIG. 8).

Second cart coupling hook 152 is formed of a second elongate rod 121, see FIG. 2 and FIG. 5. FIG. 5 shows a side view of shopping cart bagging station 110, showing additional features of second cart coupling hook 152. First cart coupling hook 150 and third cart coupling hook 148 also include the additional features described for second cart coupling hook 152, but these features are not shown on first cart coupling hook 150 and third cart coupling hook 148 for simplicity of the figures.

Second elongate rod 121 has a second elongate rod first end 112 and a second elongate rod second end 114 opposing second elongate rod first end 112, see FIG. 2 and FIG. 5. Second cart coupling hook 152 includes a second shank 155, a second rectangular hook 161, and a second helical hook 167, see FIG. 2 through FIG. 5. Second helical hook 167 extends from second elongate rod first end 112 to helical hook end 116 (FIG. 5). Rectangular hook 161 is coupled to second helical hook 167 and extends from helical hook end 116 to a second shank first end 159 of second shank 155. Rectangular hook 161 includes a right angle (90 degree) first bend 163 and a right angle second bend 165. Second shank 155 extends from second shank first end 159 to a second shank second end 157. Second shank 155 is coupled to rectangular hook 161.

Second shank 155 and second rectangular hook 161 couple cart coupling hook 152, and shopping cart bagging station 110, to shopping cart 118. Second helical hook 167 holds the handle of one or more shopping bags so the shopping bags can be filled.

Second rectangular hook 161 hangs over side 142 of shopping cart 118 to couple shopping cart bagging station 110 to shopping cart 118. Second rectangular hook 161 includes first bend 163 and second bend 165. Each of first bend 163 and second bend 165 are bends of about 90 degrees in this embodiment. In this way, second rectangular hook 161 is configured to hang from side 142 of shopping cart 118. Second rectangular hook 161 separates second helical hook 167 from second shank 155. Second rectangular hook 161 includes a helix extension 131 (FIG. 5) that extends from helical hook end 116 to second bend 165. Second rectangular hook 161 also includes a rectangular bend coupler 132 (FIG. 5). Rectangular bend coupler 132 is straight and extends from second bend 165 to second shank first end 159. First bend 163 is formed at the junction of rectangular bend coupler 132 and second shank first end 159. Since first bend 163 is a right angle bend of about 90 degrees, rectangular bend coupler 132 is perpendicular to second shank 155. Second bend 165 is also a right angle bend, thus, rectangular bend coupler 132 is perpendicular to helix extension 131.

Second helical hook 167 is a cylindrical helix-shaped hook that holds a handle of one or more shopping bags. Second helical hook 167 is coupled to second rectangular hook 161. Second helical hook 167 is helix-shaped in this embodiment so that shopping bag handles can be easily put on and taken off second helical hook 167. In some embodiments, second helical hook 167 has other shapes (see, for example, shopping cart bagging station 310 shown in FIG. 8).

Second shank 155 is coupled to support structure 122. In this embodiment, second shank 155 is coupled to support structure 122 second end 130. Second shank 155 is coupled to top support bar 124 and bottom support bar 126 of support structure 122. Second shank 155 opposes second helical hook 167, in that second rectangular hook 161 is between second helical hook 167 and second shank 155. Second shank 155 extends down side 142 of shopping cart 118, stabilizing shopping cart bagging station 110 when a full shopping bag is hung from shopping cart bagging station 110, and keeping the shopping bag from pulling shopping cart bagging station 110 off side 142.

Second shank second end 157, in this embodiment, has a second end loop 169 coupled to second shank second end 157. Second end loop 169 helps to keep shopping cart bagging station 110 from sliding sideways on side 142 of shopping cart 118 by holding shopping cart bagging station 110 steady against the bars of shopping cart 118. Second shank first end 159 is coupled to second rectangular hook 161. Second shank 155 is formed of a portion of elongate rod 121 that is straight in this embodiment, but this is not meant to be limiting. In some embodiments, second shank 155 has one or more bends (see, for example, shopping cart bagging station 210 shown in FIG. 6 and FIG. 7).

Third cart coupling hook 148 is formed of a third elongate rod 123, as shown in FIG. 2. Third elongate rod 123 has a third elongate rod first end 115 and a third elongate rod second end 117. Third cart coupling hook 148 includes a third shank 178, a third rectangular hook 181, and a third helical hook 184, see FIG. 2. Third shank 178 and third rectangular hook 181 couple cart coupling hook 148, and shopping cart bagging station 110, to shopping cart 118. Third helical hook 184 is used to hang the stack of shopping bags from, by extending third helical hook 184 through the center hole of the stack of shopping bags, so the shopping bags can be filled.

Third shank 178 is coupled to support structure 122. In this embodiment, third shank 178 is coupled to support structure 122 between support structure first end 128 and support structure second end 130. In some embodiments, third shank 178 is coupled to support structure 122 halfway between support structure first end 128 and support structure second end 130. Third shank 178 is coupled to top support bar 124 and bottom support bar 126 of support structure 122. Third shank 178 extends down side 142 of shopping cart 118, stabilizing shopping cart bagging station 110 when a full shopping bag is hung from shopping cart bagging station 110, and keeping the shopping bag from pulling shopping cart bagging station 110 off side 142.

Third shank 178 has a third shank first end 180 and a third shank second end 179 opposing third shank first end 180. Third shank second end 179 in this embodiment has a third end loop 185 coupled to third shank second end 179. Third end loop 185 helps to keep shopping cart bagging station 110 from sliding sideways on side 142 of shopping cart 118 by holding shopping cart bagging station 110 steady against the bars of shopping cart 118. Third shank first end 180 is coupled to third rectangular hook 181. Third shank 178 is formed of a portion of third elongate rod 123 that is straight in this embodiment, but this is not meant to be limiting. In some embodiments, third shank 178 has one or more bends (see, for example, shopping cart bagging station 210 shown in FIG. 6 and FIG. 7).

Third rectangular hook 181 hangs over side 142 of shopping cart 118 to couple shopping cart bagging station 110 to shopping cart 118. Third rectangular hook 181 includes a first bend 182 and a second bend 183. Each of first bend 182 and second bend 183 are bends of about 90 degrees in this embodiment. In this way, third rectangular hook 181 is configured to hang from side 142 of shopping cart 118. Third rectangular hook 181 separates third helical hook 184 from third shank 178.

Third helical hook 184 is a cylindrical helix-shaped hook that holds a stack of shopping bags. Third helical hook 184 is coupled to third rectangular hook 181. Third helical hook 184 is cylindrical helical shaped, in this embodiment, so that third helical hook 184 can easily slip through the center hanger hole of the stack of shopping bags. In some embodiments, third helical hook 184 has other shapes (see, for example, shopping cart bagging station 310 shown in FIG. 8).

Top support bar 124 and bottom support bar 126 of bagging station 110 are parallel to each other. First cart coupling hook 150, second cart coupling hook 152, and third cart coupling hook 148 are each parallel to each other. First cart coupling hook 150, second cart coupling hook 152, and third cart coupling hook 148 are each perpendicular to both top support bar 124 and bottom support bar 126, see FIG. 3.

Figure 6:
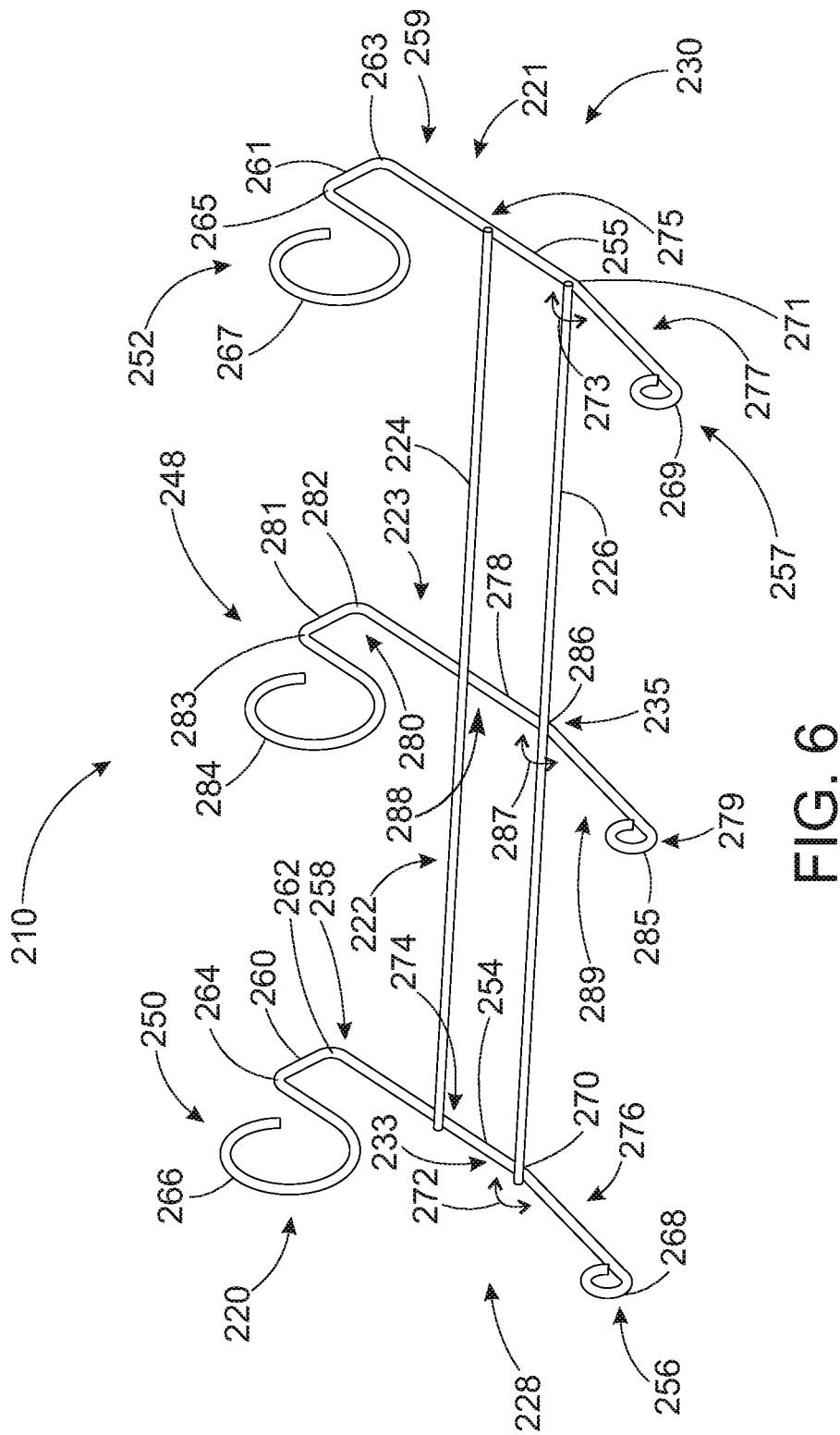
FIG. 6 shows a front perspective view of a further embodiment of a shopping cart bagging station.
Figure 7:
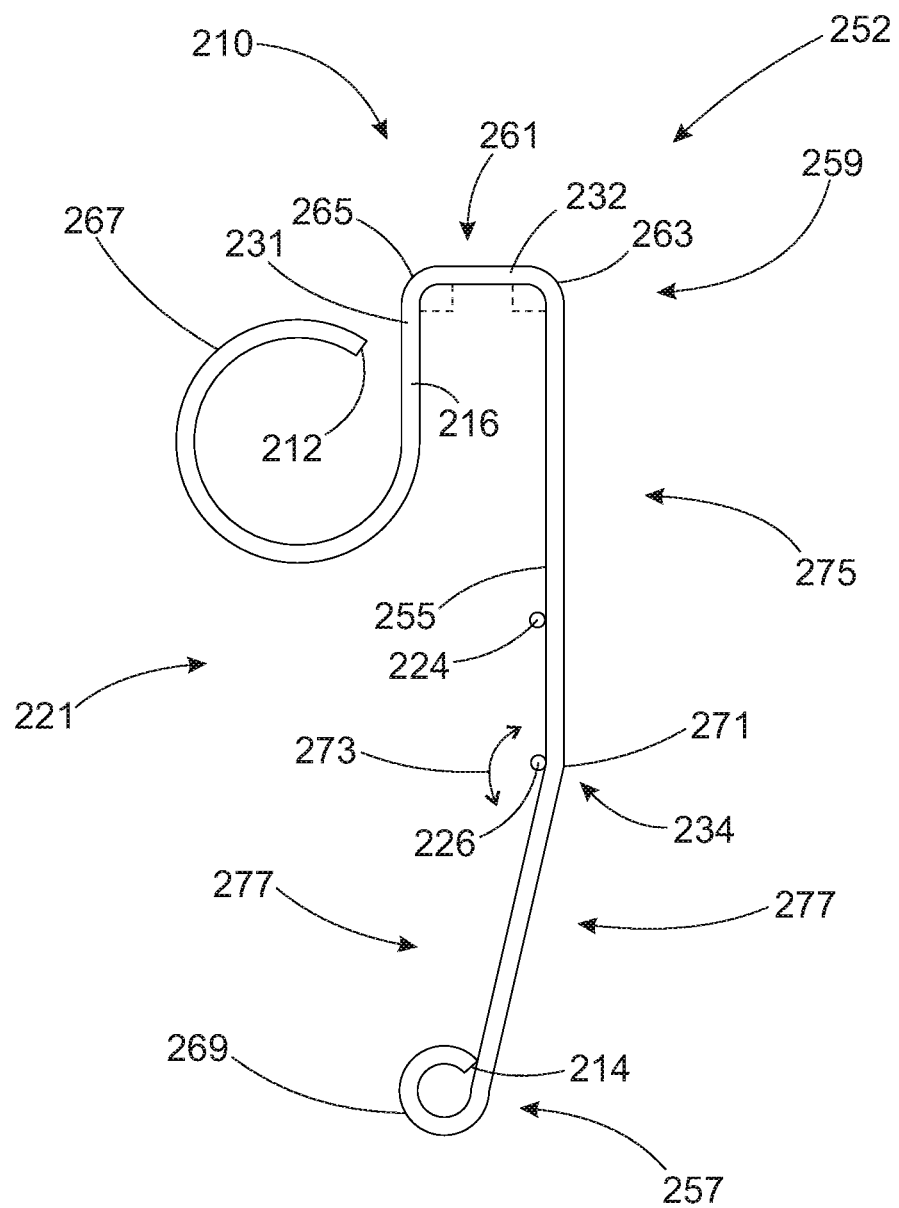
FIG. 7 shows a side view of the shopping cart bagging station of FIG. 6.

FIG. 6 and FIG. 7 show an embodiment of a shopping cart bagging station 210.

Shopping cart bagging station 210 is similar in use and structure to shopping cart bagging station 110 explained above, except that the cart coupling hook shanks of shopping cart bagging station 210 have bends as explained herein.

FIG. 6 shows a perspective view of a shopping cart bagging station 210. FIG. 7 shows a side view of shopping cart bagging station 210. Shopping cart bagging station 210 can be hung from a side of a shopping cart, such as shopping cart 118, replacing, or in addition to, shopping cart bagging station 110 shown in FIG. 1. Shopping cart bagging station 210 can be hung in many different positions inside and outside of a shopping cart. With shopping cart bagging station 210 hung from a side of a shopping cart, a customer or an employee can easily and conveniently use shopping cart bagging station 210 to hold and dispense shopping bags while shopping or working.

Shopping cart bagging station 210 includes a support structure 222, and three cart coupling hooks, which include a first cart coupling hook 250, a second cart coupling hook 252, and a third cart coupling hook 248. Each of first, second, and third cart coupling hooks 250, 252, and 248 couple shopping cart bagging station 210 to a shopping cart. Support structure 222 and first, second, and third cart coupling hooks 250, 252, and 248 are formed of plastic-coated rigid metal wire in this embodiment, but this is not meant to be limiting. Support structure 222 and first, second, and third cart coupling hooks 250, 252, and 248 can be formed of any rigid or semi-rigid material that can hang from a shopping cart and hold and dispense a stack of plastic shopping bags.

Third cart coupling hook 248 is used to hold a stack of shopping bags using the center hole in the stack of shopping bags. First and second cart coupling hooks 250 and 252 each hold a handle of one or more bags from the stack of shopping bags. With shopping cart bagging station 210 coupled to a shopping cart, an employee or a customer can use shopping cart bagging station 210 to hold a stack of shopping bags, and hold one shopping bag open as the shopping bag is filled with items. To fill a shopping bag, a shopping bag hung from third cart coupling hook 248 is held open with the two shopping bag handles held by first and second cart coupling hooks 250 and 252. Items are placed in the shopping bag until the shopping bag is filled. The shopping bag is removed from shopping cart bagging station 210 and placed in the shopping cart or carried from the store. In some cases, a plurality of shopping cart bagging stations 210 are coupled to a shopping cart, with each one holding a plurality of shopping bags. Shopping cart bagging station 210 is designed to be sturdy so that shopping cart bagging station 210 can hold a shopping bag in place with a heavy load in the shopping bag.

Each of first, second, and third cart coupling hooks 250, 252, and 248 are coupled to support structure 222. Support structure 222 couples each of first, second, and third cart coupling hooks 250, 252, and 248 together and provides the structural support for shopping cart bagging station 210. Support structure 222 is formed of two metal rigid bars in this embodiment, top support bar 224 and bottom support bar 226. Top support bar 224 and bottom support bar 226 are parallel to each other, in this embodiment, and perpendicular to each of first, second, and third cart coupling hooks 250, 252, and 248. Support structure 222 has a support structure first end 228 and a support structure second end 230 opposing support structure first end 228. Support structure 222 can take many different forms in other embodiments. In some embodiments, support structure 222 is a metal plate or a pair of metal plates, for example but not by way of limitation.

First cart coupling hook 250 is coupled to support structure first end 228, and second cart coupling hook 252 is coupled to support structure second end 230. At either end of support structure 222, first and second cart coupling hooks 250 and 252 are positioned to hold the two handles of one or more shopping bags so that the bag is held open to be filled.

Third cart coupling hook 248 is coupled to support structure 222 between support structure first end 228 and support structure second end 230. Third cart coupling hook 248 is coupled to support structure 222 between support structure first end 228 and support structure second end 230 because third cart coupling hook 248 is meant to extend through the center hole of the stack of plastic shopping bags, and the center hole is between the two handles. In this embodiment, third cart coupling hook 248 is coupled to support structure 222 halfway between support structure first end 228 and support structure second end 230, but this is not meant to be limiting.

First, second, and third cart coupling hooks 250, 252, and 248 are each configured to both couple shopping cart bagging station 210 to a shopping cart, and to help hold and dispense a stack of shopping bags.

First cart coupling hook 250 is formed of a first elongate rod 220. First cart coupling hook 250 includes a first shank 254, a first rectangular hook 260, and a first helical hook 266. First shank 254 and first rectangular hook 260 couple cart coupling hook 250, and shopping cart bagging station 210, to a shopping cart. First helical hook 266 holds the handle of one or more shopping bags so the shopping bags can be filled.

First shank 254 is coupled to support structure 222. In this embodiment, first shank 254 is coupled to support structure 222 first end 228. First shank 254 is coupled to top support bar 224 and bottom support bar 226 of support structure 222. First shank 254 is coupled to bottom support bar 226 at a bottom support bar shank couple 233, which is the location along first shank 254 where bottom support bar 226 is coupled to first shank 254. First shank 254 opposes first helical hook 266, with first rectangular hook 260 between first helical hook 266 and first shank 254. First shank 254 has a first shank first end 258 and a first shank second end 256 opposing first shank first end 258. First shank 254 extends down the side of a shopping cart, stabilizing shopping cart bagging station 210 when a full shopping bag is hung from shopping cart bagging station 210, and keeping the shopping bag from pulling shopping cart bagging station 210 off the side of the shopping cart.

First shank 254 in this embodiment has a first end loop 268 coupled to first shank second end 256 of first shank 254. First end loop 268 helps to keep shopping cart bagging station from sliding sideways on a side of a shopping cart by holding shopping cart bagging station 210 steady against the bars of the shopping cart.

First shank 254 has a shank bend 270 between first shank first end 258 and first shank second end 256. Shank bend 270 divides first shank 254 into a first shank top portion 274 and a first shank bottom portion 276. Shank bend 270 is positioned at bottom support bar shank couple 233 where bottom support bar 226 couples to first shank 254, in this embodiment. In some embodiments, shank bend 270 is at other locations along first shank 254. Shank bend 270 places first shank bottom portion 276 between the bars of the shopping cart, adding further side-to-side stability to shopping cart bagging station 210. Shank bend 270 forms an obtuse shank angle 272 of greater than 90 degrees but less than 180 degrees. In this embodiment, shank angle 272 is an angle of about 175 degrees, which has been shown to place first shank bottom portion 276 between the bars of the shopping cart, without having first shank bottom portion 276 sticking too far into the shopping cart and interfering with the shopping bags. In some embodiments, shank angle 272 is between about 170 and about 180 degrees. This range of angles for shank angle 272 has been found to stabilize shopping cart bagging station 210.

First rectangular hook 260 hangs over a side of a shopping cart to couple shopping cart bagging station 210 to the shopping cart. First rectangular hook 260 is coupled to first shank first end 258. First rectangular hook 260 includes two right angle bends, first bend 262 and second bend 264, in this embodiment.

First helical hook 266 is a cylindrical helix-shaped hook that holds a handle of one or more shopping bags. First helical hook 266 is coupled to first rectangular hook 260. First helical hook 266 is cylindrical helical shaped in this embodiment so that shopping bag handles can be easily put on first helical hook 266, and removed from first helical hook 266. In some embodiments, first helical hook 266 has other shapes (see, for example, shopping cart bagging station 310 shown in FIG. 8).

Second cart coupling hook 252 is formed of a second elongate rod 221. Second elongate rod 221 has a second elongate rod first end 212, and a second elongate rod second end 214 opposing second elongate rod first end 212, as seen in FIG. 7. Second cart coupling hook 252 is shown in detail in FIG. 7, which shows a side view of shopping cart bagging station 210. First cart coupling hook 250 and third cart coupling hook 248 also possess the features described and shown in FIG. 7 for second cart coupling hook 252, but they are not shown for simplicity of the figures.

Second cart coupling hook 252 includes a second shank 255, a second rectangular hook 261, and a second helical hook 267, see FIG. 6 and FIG. 7. Second shank 255 and second rectangular hook 261 couple cart coupling hook 252, and shopping cart bagging station 210, to a shopping cart. Second helical hook 267 holds the handle of one or more shopping bags so the shopping bags can be filled.

Second helical hook 267 is a cylindrical helix-shaped hook that holds a handle of one or more shopping bags. Second helical hook 267 is cylindrical helical shaped, in this embodiment, so that shopping bag handles can be easily put on and taken off of second helical hook 267. In some embodiments, second helical hook 267 has other shapes (see, for example, shopping cart bagging station 310 shown in FIG. 8). Second helical hook 267 extends from second elongate rod first end 212 to a helical hook end 216, see FIG. 7. Second helical hook 267 is coupled to second rectangular hook 261.

Second rectangular hook 261 hangs over a side of a shopping cart to couple shopping cart bagging station 210 to a shopping cart. Second rectangular hook 261 includes a first bend 263 and a second bend 265, see FIG. 7. Each of first bend 263 and second bend 265 are bends of about 90 degrees in this embodiment. In this way, second rectangular hook 261 is configured to hang from a side of a shopping cart. Second rectangular hook 261 separates second helical hook 267 from second shank 255. Second rectangular hook 261 is coupled to second helical hook 267, and extends from helical hook end 216 to a second shank first end 259 of second shank 255. Second rectangular hook 261 includes a helix extension 231 and a rectangular bend coupler 232 (FIG. 7). Helix extension 231 is straight and extends from helical hook end 216 to second bend 265. Rectangular bend coupler 232 is straight and extends from second bend 265 to second shank first end 259. Second bend 265 is a right angle (90 degree) bend, which means helix extension 231 is perpendicular to rectangular bend coupler 232. First bend 263 is located where rectangular bend coupler 232 couples to second shank 255, at second shank first end 259. First bend 263 is a right angle bend. Thus, rectangular bend coupler 232 is perpendicular to a second shank top portion 275.

Second shank 255 is coupled to rectangular hook 261. Second shank 255 extends from second shank first end 259 to a second shank second end 257. Second shank 255 is coupled to support structure 222. In this embodiment, second shank 255 is coupled to support structure 222 second end 230. Second shank 255 is coupled to top support bar 224 and bottom support bar 226 of support structure 222. Second shank 255 is coupled to bottom support bar 226 at a bottom support bar shank couple 234, as shown in FIG. 6 and FIG. 7. Second shank 255 opposes second helical hook 267, with second rectangular hook 261 between second helical hook 267 and second shank 255. Second shank 255 extends down the side of a shopping cart, stabilizing shopping cart bagging station 210 when a full shopping bag is hung from shopping cart bagging station 210, and keeping the shopping bag from pulling shopping cart bagging station 210 off the side of the shopping cart.

Second shank second end 257 in this embodiment has a second end loop 269 coupled to second shank second end 257. Second end loop 269 helps to keep shopping cart bagging station 210 from sliding sideways on a side of a shopping cart by holding shopping cart bagging station 210 steady against the bars of the shopping cart. Second shank first end 259 is coupled to second rectangular hook 261 at first bend 263.

Second shank 255 is formed of a portion of elongate rod 221 that has a shank bend 271 in second shank 255, see FIG. 6 and FIG. 7. Shank bend 271 is positioned at bottom shank bar support couple 234, which is a position along second shank 255 where bottom support bar 226 couples to second shank 255, in this embodiment. In some embodiments, shank bend 271 is at other locations along second shank 255. Shank bend 271 divides second shank 255 into a second shank top portion 275 and a second shank bottom portion 277. Shank bend 271 places second shank bottom portion 277 between the bars of the shopping cart when shopping cart bagging station 210 is coupled to the shopping cart, adding side-to-side stability to shopping cart bagging station 210. Shank bend 271 forms an obtuse shank angle 273 of more than 90 degrees but less than 180 degrees between second shank top portion 275 and second shank bottom portion 277. In this embodiment, shank angle 273 is an angle of about 175 degrees, which has been shown to place second shank bottom portion 277 between the bars of the shopping cart, without having second shank bottom portion 277 sticking too far into the shopping cart and interfering with the shopping bags. In some embodiments, shank angle 273 is between about 170 and about 180 degrees. This range of angles for shank angle 273 has been found to stabilize shopping cart bagging station 210.

Third cart coupling hook 248 is formed of a third elongate rod 223, see FIG. 6. Third cart coupling hook 248 includes a third shank 278, a third rectangular hook 281, and a third helical hook 284, see FIG. 6. Third shank 278 and third rectangular hook 281 couple cart coupling hook 248, and shopping cart bagging station 210, to a shopping cart. Third helical hook 284 is used to hang the stack of shopping bags from, using the center hole through the stack of shopping bags, so the shopping bags can be filled.

Third rectangular hook 281 hangs over a side of a shopping cart to couple shopping cart bagging station 210 to the shopping cart. Third rectangular hook 281 separates third helical hook 284 from third shank 278. Third rectangular hook 281 includes two right angle bends, first bend 282 and second bend 283, as shown in FIG. 6. First bend 282 is positioned where third rectangular hook 281 couples to third shank 278.

Third helical hook 284 is a cylindrical helix-shaped hook that holds a stack of shopping bags. Third helical hook 284 is coupled to third rectangular hook 281. Third helical hook 284 is cylindrical helical shaped in this embodiment, so that the hole through a stack of shopping bags can be easily put on third helical hook 284. In some embodiments, third helical hook 284 has other shapes (see, for example, shopping cart bagging station 310 shown in FIG. 8).

Third shank 278 extends from a third shank first end 280 to a third shank second end 279 opposing third shank first end 280. Third shank first end 280 is coupled to third rectangular hook 281 at first bend 282. Third shank 278 is coupled to support structure 222. In this embodiment, third shank 278 is coupled to support structure 222 between support structure first end 228 and support structure second end 230. In some embodiments, third shank 278 is coupled to support structure 222 halfway between support structure first end 228 and support structure second end 230. Third shank 278 is coupled to top support bar 224 and bottom support bar 226 of support structure 222. Third shank 278 opposes third helical hook 284, with third rectangular hook 281 between third helical hook 284 and third shank 278. Third shank 278 extends down the side of a shopping cart, stabilizing shopping cart bagging station 210 when a full shopping bag is hung from shopping cart bagging station 210, and keeping the shopping bag from pulling shopping cart bagging station 210 off of the side of the shopping cart.

Third shank 278 in this embodiment has a third end loop 285 coupled to third shank second end 279 of third shank 278. Third end loop 285 helps to keep shopping cart bagging station 210 from sliding sideways on the side of the shopping cart by holding shopping cart bagging station 210 steady against the bars of shopping cart 218. Third shank 278 is coupled to third rectangular hook 281.

Third shank 278 is formed of a portion of third elongate rod 223 that has a shank bend 286 in third shank 278, see FIG. 6. Shank bend 286 divides third shank 278 into a third shank top portion 288 and a third shank bottom portion 289. Shank bend 286 is positioned at a bottom support bar shank couple 235, which is the position along third shank 278 where bottom support bar 226 couples to third shank 278, in this embodiment. In some embodiments, shank bend 286 is at other locations along third shank 278. Shank bend 286 places third shank bottom portion 289 between the bars of a shopping cart that shopping cart bagging station 210 is coupled to, adding side-to-side stability to shopping cart bagging station 210. Shank bend 286 forms an obtuse shank angle 287 of more than 90 degrees but less than 180 degrees. In this embodiment, shank angle 287 is an angle of about 175 degrees, which places third shank bottom portion 289 between the bars of the shopping cart, without having third shank bottom portion 289 sticking too far into the shopping cart and interfering with the shopping bags. In some embodiments, shank angle 287 is between about 170 and about 180 degrees. This range of angles for shank angle 287 stabilizes shopping cart bagging station 210.

Figure 8:
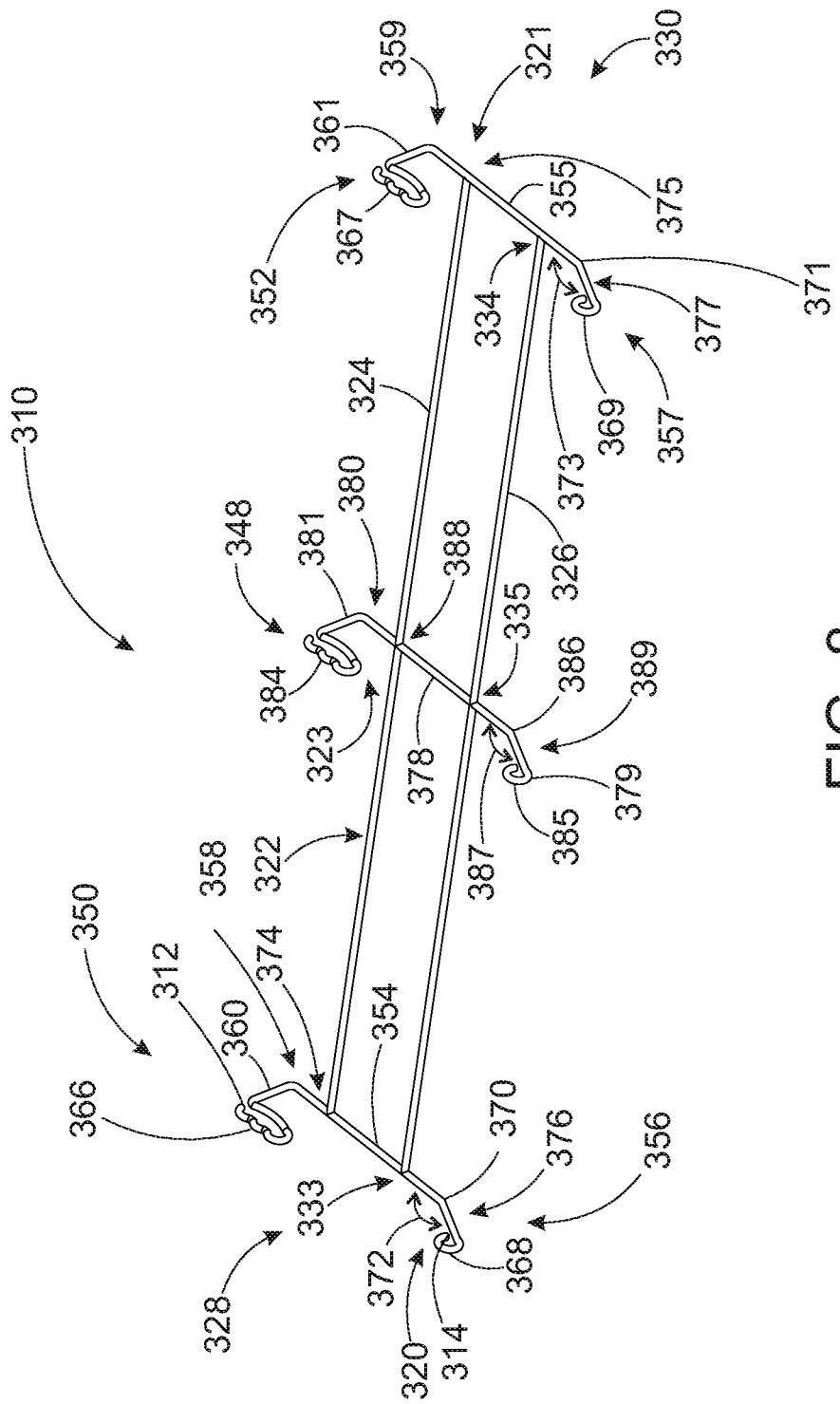
FIG. 8 shows a front perspective view of a further embodiment of a shopping cart bagging station.

FIG. 8 shows an embodiment of a shopping cart bagging station 310. Shopping cart bagging station 310 is similar in use and structure to shopping cart bagging station 110 and 210 explained above, except that the cart coupling hook shanks of shopping cart bagging station 310 have bends, and the handle hooks are not helical shaped, in this embodiment.

FIG. 8 shows a perspective view of shopping cart bagging station 310. Shopping cart bagging station 310 can be hung from a side of a shopping cart, replacing, or in addition to, shopping cart bagging station 110 shown in FIG. 1. Shopping cart bagging station 310 can be hung in many different positions inside and outside of the shopping cart. With shopping cart bagging station 310 hung from a side of a shopping cart, a customer or an employee can easily and conveniently use shopping cart bagging station 310 to hold and dispense shopping bags while shopping or working.

Shopping cart bagging station 310 includes a support structure 322, and three cart coupling hooks, which include a first cart coupling hook 350, a second cart coupling hook 352, and a third cart coupling hook 348. Each of first second, and third cart coupling hooks 350, 352, and 348 couple shopping cart bagging station 310 to a shopping cart. Support structure 322 and first, second, and third cart coupling hooks 350, 352, and 348 are formed of plastic-coated rigid metal wire in this embodiment, but this is not meant to be limiting. Support structure 322 and first, second, and third cart coupling hooks 350, 352, and 348 can be formed of any rigid or semi-rigid material that can hang from a shopping cart and hold and dispense a stack of plastic shopping bags.

Third cart coupling hook 348 is used to hold a stack of shopping bags using the center hole in the stack of shopping bags. First and second cart coupling hooks 350 and 352 each hold a handle of the stack of shopping bags. With shopping cart bagging station 310 coupled to a shopping cart, an employee or a customer can use shopping cart bagging station 310 to hold a stack of shopping bags, and hold one shopping bag open as the shopping bag is filled with items. In some cases, a plurality of shopping cart bagging stations 310 are coupled to a shopping cart, with each one holding a plurality of shopping bags. Shopping cart bagging station 310 is designed to be sturdy so that shopping cart bagging station 310 can hold a shopping bag in place with a heavy load in the shopping bag.

Each of first, second, and third cart coupling hooks 350, 352, and 348 are coupled to support structure 322. Support structure 322 couples each of first, second, and third cart coupling hooks 350, 352, and 348 together and provides the structural support for shopping cart bagging station 310. Support structure 322 is formed of two metal rigid bars in this embodiment, top support bar 324 and bottom support bar 326, which are parallel to each other and perpendicular to first, second, and third cart coupling hook 350, 352, and 348, in this embodiment. Support structure 322 has a support structure first end 328 and a support structure second end 330 opposing support structure first end 328. Support structure 322 can take many different forms. In some embodiments, support structure 322 is a metal plate or a pair of metal plates, for example but not by way of limitation.

First cart coupling hook 350 is coupled to support structure first end 328, and second cart coupling hook 352 is coupled to support structure second end 330. At either end of support structure 322, first and second cart coupling hooks 350 and 352 are positioned to hold the two handles of one or more shopping bags so that the bag is held open to be filled.

Third cart coupling hook 348 is coupled to support structure 322 between support structure first end 328 and support structure second end 330. In this embodiment, third cart coupling hook 348 is coupled to support structure 322 halfway between support structure first end 328 and support structure second end 330, but this is not meant to be limiting.

First, second, and third cart coupling hooks 350, 352, and 348 are each configured to both couple shopping cart bagging station 310 to a shopping cart, and to help hold and dispense a stack of shopping bags.

First cart coupling hook 350 is formed of a first elongate rod 320, having a first elongate rod first end 312 and a first elongate rod second end 314. First cart coupling hook 350 includes a first shank 354, a first rectangular hook 360, and a first handle hook 366. First shank 354 and first rectangular hook 360 couple cart coupling hook 350, and shopping cart bagging station 310, to a shopping cart. First handle hook 366 holds the handle of one or more shopping bags so the shopping bags can be filled.

First rectangular hook 360 hangs over a side of a shopping cart to couple shopping cart bagging station 310 to a shopping cart. First rectangular hook 360 separates first handle hook 366 from first shank 354. First rectangular hook 360 is coupled to first handle hook 366 and first shank 354.

First handle hook 366 is a U-shaped hook that holds a handle of one or more shopping bags. One side of first handle hook 366 is wavy, or corrugated, in order to more securely hold a handle of one or more shopping bags on first handle hook 366. First handle hook 366 is coupled to first rectangular hook 360. In this embodiment, the wavy side of first handle hook 366 is the side that is not coupled to first rectangular hook 360. First handle hook 366 is U-shaped in this embodiment so that shopping bag handles can be easily put on first handle hook 366, and removed from first handle hook 366.

First shank 354 extends from a first shank first end 358 to a first shank second end 356. First shank first end 358 is coupled to first rectangular hook 360. First shank 354 is coupled to support structure 322. In this embodiment, first shank 354 is coupled to support structure 322 first end 328. First shank 354 is coupled to top support bar 324 and bottom support bar 326 of support structure 322. First shank 354 is coupled to bottom support bar 326 at a bottom support bar shank couple 333, which is the location along first shank 354 where bottom support bar 326 coupled to first shank 354. First shank 354 opposes first handle hook 366, with first rectangular hook 360 between first handle hook 366 and first shank 354. First shank 354 extends down the side of a shopping cart, stabilizing shopping cart bagging station 310 when a full shopping bag is hung from shopping cart bagging station 310, and keeping the shopping bag from pulling shopping cart bagging station 310 off the side of the shopping cart.

First shank 354 in this embodiment has a first end loop 368 coupled to first shank second end 356 of first shank 354. First end loop 368 helps to keep shopping cart bagging station 310 from sliding sideways on a side of a shopping cart, by holding shopping cart bagging station 310 steady against the bars of the shopping cart.

First shank 354 is formed of a portion of first elongate rod 320 that has a shank bend 370 in first shank 354. Shank bend 370 divides first shank 354 into a first shank top portion 374 and a first shank bottom portion 376. Shank bend 370 is positioned between end loop 368 and bottom support bar shank couple 333. Shank bend 370 places first shank bottom portion 376 between the bars of the shopping cart, adding side-to-side stability to shopping cart bagging station 310. Shank bend 370 has an obtuse shank angle 372 of more than 90 degrees but less than 180 degrees. In this embodiment, shank angle 372 is an angle of about 175 degrees, which places first shank bottom portion 376 between the bars of the shopping cart, without having first shank bottom portion 376 sticking too far into the shopping cart and interfering with the shopping bags. In some embodiments, shank angle 372 is between about 170 and about 180 degrees. This range of angles for shank angle 372 stabilizes shopping cart bagging station 310.

Second cart coupling hook 352 is formed of a second elongate rod 321. Second cart coupling hook 352 includes a second shank 355, a second rectangular hook 361, and a second handle hook 367, see FIG. 8. Second shank 355 and second rectangular hook 361 couple cart coupling hook 352, and shopping cart bagging station 310, to a shopping cart. Second handle hook 367 holds the handle of one or more shopping bags so the shopping bags can be filled.

Second rectangular hook 361 hangs over a side of a shopping cart to couple shopping cart bagging station 310 to a shopping cart. Second rectangular hook 361 separates second handle hook 367 from second shank 355. Second rectangular hook 361 is coupled to second handle hook 367 and second shank 355.

Second handle hook 367 is a U-shaped hook that holds a handle of one or more shopping bags. One side of second handle hook 367 is wavy or corrugated in order to more securely hold a handle of one or more shopping bags on second handle hook 367. Second handle hook 367 is coupled to second rectangular hook 361. Second handle hook 367 is U-shaped in this embodiment so that shopping bag handles can be easily put on second handle hook 367, and removed from second handle hook 367.

Second shank 355 extends from a second shank first end 359 to a second shank second end 357. Second shank first end 359 is coupled to second rectangular hook 361. Second shank 355 is coupled to support structure 322. In this embodiment, second shank 355 is coupled to support structure 322 second end 330. Second shank 355 is coupled to top support bar 324 and bottom support bar 326 of support structure 322. Second shank 355 is coupled to bottom support bar 326 at a bottom support bar shank couple 334. Second shank 355 opposes second handle hook 367, with second rectangular hook 361 between second handle hook 367 and second shank 355. Second shank 355 extends down the side of a shopping cart, stabilizing shopping cart bagging station 310 when a full shopping bag is hung from shopping cart bagging station 310, and keeping the shopping bag from pulling shopping cart bagging station 310 off the side of the shopping cart.

Second shank 355 in this embodiment has a second end loop 369 coupled to second shank second end 357 of second shank 355. Second end loop 369 helps to keep shopping cart bagging station 310 from sliding sideways on a side of a shopping cart by holding shopping cart bagging station 310 steady against the bars of the shopping cart. Second shank 355 is coupled to second rectangular hook 361 at second shank first end 359.

Second shank 355 is formed of a portion of second elongate rod 321 that has a shank bend 371 in second shank 355, see FIG. 8. Shank bend 371 divides second shank 355 into a second shank top portion 375 and a second shank bottom portion 377. Shank bend 371 is positioned between second shank second end 357 and bottom support bar shank couple 334. In some embodiments, shank bend 371 is at other locations along second shank 355. Shank bend 371 places second shank bottom portion 377 between the bars of a shopping cart, adding side-to-side stability to shopping cart bagging station 310. Shank bend 371 forms an obtuse shank angle 373 of more than 90 degrees but less than 180 degrees. In this embodiment, shank angle 373 is an angle of about 175 degrees, which places second shank bottom portion 377 between the bars of the shopping cart, without having second shank bottom portion 377 sticking too far into the shopping cart and interfering with the shopping bags. In some embodiments, shank angle 373 is between about 170 and about 180 degrees. This range of angles for shank angle 373 stabilizes shopping cart bagging station 310.

Third cart coupling hook 348 is formed of a third elongate rod 323. Third cart coupling hook 348 includes a third shank 378, a third rectangular hook 381, and a third handle hook 384, see FIG. 8. Third shank 378 and third rectangular hook 381 couple cart coupling hook 348, and shopping cart bagging station 310, to a shopping cart. Third handle hook 384 is used to hang the stack of shopping bags from, using the center hole through the stack of shopping bags, so the shopping bags can be filled.

Third rectangular hook 381 hangs over a side of a shopping cart to couple shopping cart bagging station 310 to the shopping cart. Third rectangular hook 381 separates third handle hook 384 from third shank 378. Third rectangular hook 381 is coupled to third handle hook 384 and third shank 378.

Third handle hook 384 is a U-shaped hook that holds a stack of shopping bags. One side of third handle hook 384 is wavy or corrugated in order to more securely hold the center hole of the stack of shopping bags on third handle hook 384. Third handle hook 384 is coupled to third rectangular hook 381. Third handle hook 384 is U-shaped in this embodiment so that third handle hook 384 can be easily slid through the center hole of the shopping bags.

Third shank 378 extends from a third shank first end 380 to a third shank second end 379. Third shank first end 380 is coupled to third rectangular hook 381. Third shank 378 is coupled to support structure 322. In this embodiment, third shank 378 is coupled to support structure 322 between support structure first end 328 and support structure second end 330. In some embodiments, third shank 378 is coupled to support structure 322 halfway between support structure first end 328 and support structure second end 330. Third shank 378 is coupled to top support bar 324 and bottom support bar 326 of support structure 322. Third shank 378 is coupled to bottom support bar 326 at a bottom support bar shank couple 335. Third shank 378 opposes third handle hook 384, with third rectangular hook 381 between third handle hook 384 and third shank 378. Third shank 378 extends down the side of a shopping cart, stabilizing shopping cart bagging station 310 when a full shopping bag is hung from shopping cart bagging station 310, and keeping the shopping bag from pulling shopping cart bagging station 310 off the side of the shopping cart.

Third shank 378 in this embodiment has a third end loop 385 coupled to third shank second end 379 of third shank 378. Third end loop 385 helps to keep shopping cart bagging station 310 from sliding sideways on the side of the shopping cart by holding shopping cart bagging station 310 steady against the bars of shopping cart 318. Third shank 378 is coupled to third rectangular hook 381 at third shank first end 380.

Third shank 378 is formed of a portion of third elongate rod 323 that has a shank bend 386 in third shank 378, see FIG. 8. Shank bend 386 divides third shank 378 into a third shank top portion 388 and a third shank bottom portion 389. Shank bend 386 is positioned between end loop 385 and bottom support bar shank couple 334. In some embodiments, shank bend 386 is at other locations along third shank 378. Shank bend 386 places third shank bottom portion 389 between the bars of a shopping cart, adding side-to-side stability to shopping cart bagging station 310. Shank bend 386 forms an obtuse shank angle 387 of more than 90 degrees but less than 180 degrees. In this embodiment, shank angle 387 is an angle of about 175 degrees, which places third shank bottom portion 389 between the bars of the shopping cart, without having third shank bottom portion 389 sticking too far into the shopping cart and interfering with the shopping bags. In some embodiments, shank angle 387 is between about 170 and about 180 degrees. This range of angles for shank angle 387 stabilizes shopping cart bagging station 310.

Figure 9:
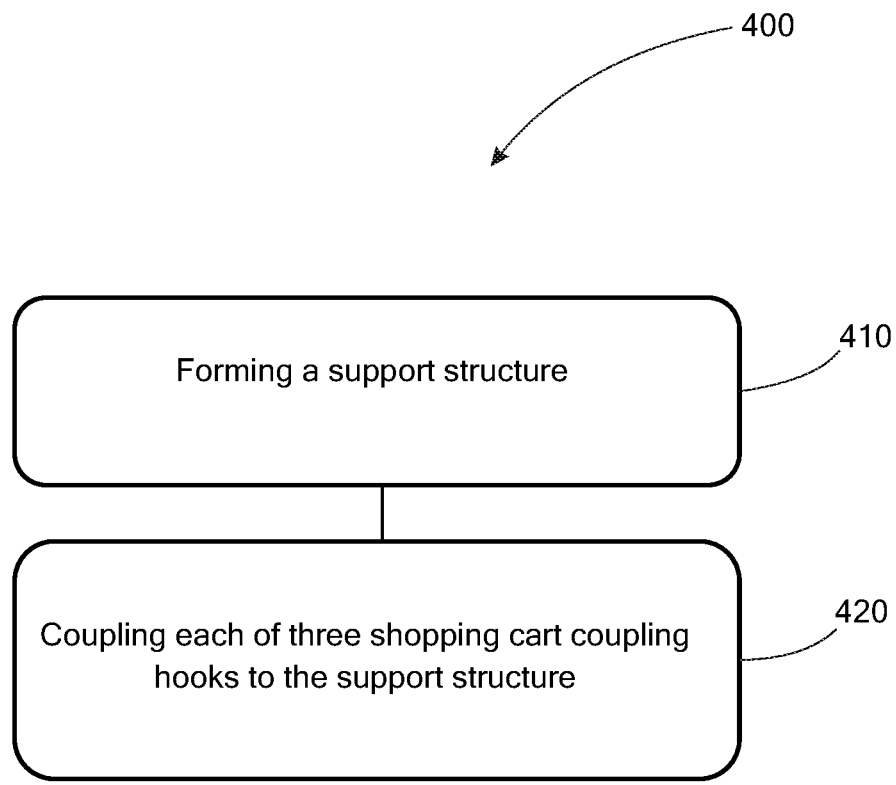
FIG. 9 illustrates a method of forming a shopping cart bagging station.

FIG. 9 illustrates a method 400 of forming a shopping cart bagging station. Method 400 includes an act 410 of forming a support structure, and an act 420 of coupling each of three cart coupling hooks to the support structure. Method 400 can include many other acts.

In some embodiments, act 410 of forming of the support structure includes forming a top support bar. In some embodiments, act 410 of forming of the support structure includes forming a bottom support bar.

In some embodiments, method 400 includes forming a first shopping cart coupling hook. In some embodiments, forming a first shopping cart coupling hook includes bending a rectangular hook in a piece of elongate rod, where the rectangular hook includes a first and a second bend of approximately 90 degrees, and where the rectangular hook separates a shank from a helical hook. In some embodiments, forming a first shopping cart coupling hook includes bending the helical hook into a helix. In some embodiments, forming a first shopping cart coupling hook includes placing an obtuse angle shank bend in the shank. In some embodiments, forming a first shopping cart coupling hook includes bending an end loop in the shank.

In some embodiments, act 420 of coupling each of the three shopping cart coupling hooks to the support structure includes coupling a first shopping cart coupling hook to a support structure first end. In some embodiments, act 420 of coupling each of the three shopping cart coupling hooks to the support structure includes coupling a second shopping cart coupling hook to a support structure second end, where the second end opposes the first end. In some embodiments, act 420 of coupling each of the three shopping cart coupling hooks to the support structure includes coupling a third shopping cart coupling hook halfway between the first shopping cart coupling hook and the second shopping cart coupling hook.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A combination shopping cart and shopping cart bagging station comprising:
   at least one shopping bag;
   a support structure comprising a top support bar and a bottom support bar, wherein the top support bar and the bottom support bar are parallel to each other; and
   at least one cart coupling hook fixedly attached to the support structure, wherein the at least one cart coupling hook comprises an elongate rod comprising:
      a helical hook, wherein the helical hook is in the shape of a cylindrical helix, and wherein the helical hook extends from an elongate rod first end to a helical hook end; and
      a rectangular hook coupled to the helical hook, wherein the rectangular hook extends from the helical hook end to a shank first end of a shank, and wherein the rectangular hook includes a 90 degree bend;
   wherein the shank is coupled to the rectangular hook, wherein the shank is coupled to the support structure, wherein the shank extends from the shank first end to a shank second end, wherein the shopping cart bagging station is coupled to the shopping cart, wherein the at least one cart coupling hook comprises a first cart coupling hook attached to a support structure first end, a second cart coupling hook attached to a support structure second end, and a third cart coupling hook attached to the support structure between the support structure first end and the support structure second end, and wherein the at least one shopping bag is coupled to the first cart coupling hook, the second cart coupling hook and the third cart coupling hook.

2. The combination shopping cart and shopping cart bagging station of claim 1, wherein the at least one cart coupling hook further comprises an end loop coupled to the shank second end.

3. The combination shopping cart and shopping cart bagging station of claim 1, wherein the rectangular hook comprises:
   a helix extension, wherein the helix extension is straight and extends from the helical hook end to the 90 degree bend; and
   a rectangular bend coupler, wherein the rectangular bend coupler is straight and extends from the 90 degree bend to the shank first end, and wherein the rectangular bend coupler is perpendicular to the helix extension.

4. The combination shopping cart and shopping cart bagging station of claim 3, wherein the shank is perpendicular to the rectangular bend coupler.

5. The combination shopping cart and shopping cart bagging station of claim 4, wherein the shank is straight.

6. The combination shopping cart and shopping cart bagging station of claim 4, wherein the shank has a shank bend that separates a shank top portion from a shank bottom portion, wherein the shank bend forms a shank angle of less than about 180 degrees between the shank top portion and the shank bottom portion.

7. The combination shopping cart and shopping cart bagging station of claim 6, wherein the shank bend forms a shank angle of about 175 degrees between the shank top portion and the shank bottom portion.

8. The combination shopping cart and shopping cart bagging station of claim 7, wherein the shank bend is located at a bottom support bar shank couple.

9. The combination shopping cart and shopping cart bagging station of claim 7, wherein the shank bend is located between the bottom support bar shank couple and the shank second end.

10. A combination shopping cart and shopping cart bagging station comprising:
   at least one shopping bag;
   a support structure comprising a top support bar and a bottom support bar, wherein the top support bar and the bottom support bar are parallel to each other; and
   at least one cart coupling hook fixedly attached to the support structure, wherein the at least one cart coupling hook comprises an elongate rod comprising:
      a shank with a shank first end and a shank second end opposing the shank first end;
      a rectangular hook coupled to the shank first end, wherein the rectangular hook comprises a right angle bend; and
      a helical hook coupled to the rectangular hook, wherein the helical hook is in the shape of a cylindrical helix, wherein the shopping cart bagging station is coupled to the shopping cart, wherein the at least one cart coupling hook comprises a first cart coupling hook attached to a support structure first end, a second cart coupling hook attached to a support structure second end, and a third cart coupling hook attached to the support structure halfway between the support structure first end and the support structure second end, and wherein the at least one shopping bag is coupled to the first cart coupling hook, the second cart coupling hook and the third cart coupling hook.

11. The combination shopping cart and shopping cart bagging station of claim 10, wherein the at least one cart coupling hook further comprises an end loop coupled to the shank second end.

12. The combination shopping cart and shopping cart bagging station of claim 11, wherein the shank is straight.

13. The combination shopping cart and shopping cart bagging station of claim 12, wherein the shank has a shank bend that separates a shank top portion from a shank bottom portion, wherein the shank bend forms an angle of less than about 180 degrees between the shank top portion and the shank bottom portion.

14. The combination shopping cart and shopping cart bagging station of claim 13, wherein the shank bend forms an angle in the range of between about 170 degrees to about 180 degrees between the shank top portion and the shank bottom portion.

15. The combination shopping cart and shopping cart bagging station of claim 14, wherein the first shank bend forms an angle of about 175 degrees between the shank top portion and the shank bottom portion.

16. The combination shopping cart and shopping cart bagging station of claim 13, wherein the shank bend is located at a bottom support bar shank couple.

17. The combination shopping cart and shopping cart bagging station of claim 13, wherein the shank bend is located between the bottom support bar shank couple and the shank second end.

18. The combination shopping cart and shopping cart bagging station of claim 13, wherein the shank is coupled to both the top support bar and the bottom support bar.

* * * * *